(12) United States Patent
McKeen et al.

(10) Patent No.: US 6,704,861 B1
(45) Date of Patent: Mar. 9, 2004

(54) MECHANISM FOR EXECUTING COMPUTER INSTRUCTIONS IN PARALLEL

(75) Inventors: Francis X. McKeen, Westborough, MA (US); Michael C. Adler, Lexington, MA (US); Joel S. Emer, Acton, MA (US); Robert P. Nix, Concord, MA (US); David J. Sager, Acton, MA (US); P. Geoffrey Lowney, Concord, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1437 days.

(21) Appl. No.: 08/752,729

(22) Filed: Nov. 19, 1996

Related U.S. Application Data (63) Continuation of application No. 08/339,628, filed on Nov. 15, 1994, now abandoned, which is a continuation of application No. 08/079,479, filed on Jun. 17, 1993, now abandoned.

(51) Int. Cl.$^7$ .................................................. G06F 9/38
(52) U.S. Cl. ....................................... 712/244; 712/215
(58) Field of Search ................................ 395/582, 591, 395/391; 712/244, 215

(56) References Cited

U.S. PATENT DOCUMENTS

| | | | | |
|---|---|---|---|---|
| 4,722,050 A | | 1/1988 | Lee et al. ................... | 364/200 |
| 4,777,594 A | | 10/1988 | Jones et al. ................. | 364/200 |
| 4,791,557 A | | 12/1988 | Angel et al. ................ | 364/200 |
| 4,847,755 A | * | 7/1989 | Morrison et al. ........... | 395/650 |
| 5,125,083 A | | 6/1992 | Fite et al. ................... | 395/375 |
| 5,136,696 A | | 8/1992 | Beckwith et al. ........... | 395/375 |
| 5,142,633 A | | 8/1992 | Murray et al. .............. | 395/375 |
| 5,287,466 A | * | 2/1994 | Kodama ...................... | 395/375 |
| 5,561,776 A | * | 10/1996 | Popescu et al. ............. | 395/586 |

OTHER PUBLICATIONS

Smith, M. D., Lam, M. S., Horowitz, M. A., "Boosting beyond static scheduling in a superscalar processor," in Proceedings of the 17$^{th}$ International Symposium on Computer Architecture, pp. 344–354, May 1990.*

"Sentinel Scheduling for VLIW and Superscalar Processors", Scott A. Mahlke et al., ASPLOS V—10/92/MA, USA 1992 ACM 0–89791–535–6/92/0010/0238, pp. 238–247.

"Software Support for Speculative Loads", Anne Rogers et al., ASPLOS V—10/92/MA, USA, 1992 ACM 0–89791–535–6/92/0010/0038, pp. 38–50.

"Efficient Superscalar Performance Through Boosting", Michael D. Smith et al., ASPLOS V—10/92/MA, USA, 1992 ACM 0–89791–535–6/92/0010/0248, pp. 248–259.

"A VLIW Architecture for a Trace Scheduling Compiler", Robert P. Colwell et al., Association for Computer Machinery, ACM 0–89791–238–1/87/1000–0180, pp. 180–192.

* cited by examiner

*Primary Examiner*—Richard L. Ellis (57) ABSTRACT

A mechanism for executing computer instructions in parallel includes a compiler for generating and grouping instructions into a plurality of sets of instructions to be executed in parallel, each set having a unique identification. A computer system having a real state and a speculative state executes the sets in parallel, the computer system executing a particular set of instructions in the speculative state if the instructions of the particular set have dependencies which can not be resolved until the instructions are actually executed. The computer system generates speculative data while executing instructions in the speculative state. Logic circuits are provided to detect any exception conditions which occur while executing the particular set in the speculative state. If the particular set is subject to an exception condition, the instructions of the set are re-executed to resolve the exception condition, and to incorporate the speculative data in the real state of the computer system.

18 Claims, 8 Drawing Sheets

MECHANISM FOR EXECUTING COMPUTER INSTRUCTIONS IN PARALLEL

This application is a continuation of application Ser. No. 08/339,628, filed Nov. 15, 1994, now abandoned, which is a continuation of application Ser. No. 08/079,479, filed Jun. 17, 1993, now abandoned.

FIELD OF THE INVENTION

This invention relates generally to executing instructions in a computer system, and more particularly to a method and apparatus for executing instructions in parallel.

BACKGROUND OF THE INVENTION

Conventional digital computers process instructions of a program in accordance with fetch and execute cycles in which instructions are fetched from memory and executed by the processor. Each fetch or execute cycle may include a number of intermediate steps. For example, the processing of an instruction manipulating data may require the fetching of additional operands from memory, and the storing of data generated as a result of the execution of the instruction. Or, the processing of an instruction manipulating the control flow of the program may examine the value of the operands and alter the program flow accordingly.

In conventional low speed computers, the fetch and execute cycle are performed for one instruction at the time. That is, the fetch for the next instruction does not occur until the previous instruction has been completely processed. The hardware that is used during the fetching steps remains idle until it is needed for the next instruction.

However, the speed at which computers can process instructions and data has increased much faster than the speed at which memory can supply the instructions and data to the computer. This memory latency can be hidden by processing multiple instructions concurrently. For example, the next instruction is fetched from memory prior to storing the result of the previous instruction. This is a simple form of instruction level parallelism or pipelining.

Also, the size of computer chips has increased faster than the speed of the logic circuits on the chip. Therefore, a further performance advantage can be gained by using the larger available space on the silicon to process multiple instructions in parallel.

The total throughput of the computer can be further increased by pre-processing or accelerating the execution of certain instructions, particularly instructions which require a large number of cycles, or which may be subject to long latencies. For example, a load instruction may attempt to read data which are not stored in a local fast memory such as a cache. In this case a subsequent instruction operating on the data can not be executed until the data are read, possibly from a virtual memory device. It would be an advantage to move such instructions up in the execution sequence so that the data become available earlier.

Pre-processing of instructions is sometimes known as speculative execution. Speculative execution is also known as the condition where all of the dependencies, control and data, for the instruction are not resolvable at the time the instruction is generated.

Various techniques are known for providing speculative execution of instructions. For example, speculative execution is sometimes engineered at run-time by dynamically processing instructions out of their original order. Other techniques, reorder the execution sequence of the instructions of a program at the time that a source program is compiled into a run-time program or object code. Some techniques require the use of complex hardware not readily adaptable to simple processors such as RISC computers.

A serious problem with the known techniques of speculative execution is the correct detection and management of exception conditions that occur, particularly when multiple instructions are executed in parallel. Exception conditions are signals used to indicate unexpected conditions, for example, the processing of the instruction could not be completed, or the result generated requires further attention, due to, for example, address faults, arithmetic inconsistencies, and the like.

An exception condition that occurred for a speculative instruction which should not have been executed must be ignored. On the other hand, an exception condition for a speculative instruction that was supposed to be executed must be signaled. Most known techniques execute instructions speculatively with the understanding that the instructions will not generate exception conditions. Enforcing these restrictions generally constrain the degree of parallelism possible. Should an exception condition occur anyway, known techniques generally abort processing altogether.

Recovery from an excepting speculative instruction should be possible. This is particularly true for instructions which are executed speculatively in parallel. For example, if multiple instructions are executed in parallel, only the instruction which encountered the exception condition should be reprocessed. The data generated by the instructions which were successfully executed in parallel should not be effected.

Therefore, there is a need for a mechanism which allows for the execution of instructions in parallel without undue restrictions, especially when exception conditions are encountered.

SUMMARY OF THE INVENTION

There is provided a mechanism for executing computer instructions in parallel. The mechanism includes a compiler for generating and grouping instructions into a plurality of sets of instructions. The sets of instructions to be executed in parallel. The compiler assigns a unique identification to the instructions of each of the sets so that the instructions of the individual sets can be distinguished when executed in parallel.

A computer system is provided for executing the instructions in parallel. The computer system has a real state and a speculative state, the computer system executing a particular set of instructions in the speculative state if the instructions of the particular set have dependencies which can not be resolved until the instructions are actually executed. Unresolvable dependencies can be data and control dependencies. The computer system generates speculative data while executing instructions in the speculative state. The speculative data include identification for associating the speculative data with the particular set of instructions.

A mechanism is provided to detect any exception conditions which occur while executing the particular set in the speculative state. If the particular set is subject to an exception condition, the instructions of the set are re-executed to resolve the exception condition, and to incorporate the speculative data in the real state of the computer system. During the re-execution, only the set which encountered the exception condition is re-executed. Any other sets of instructions, which were executed in parallel with the particular set, and which are not subject to an exception condition are not re-executed.

BRIEF DESCRIPTION OF THE FIGURES

The accompanying drawings, which are incorporated and constitute a part of the specification, illustrate the embodiments of the invention, wherein.

DETAILED DESCRIPTION OF THE PREFERRED EMBODIMENT

Figure 1:
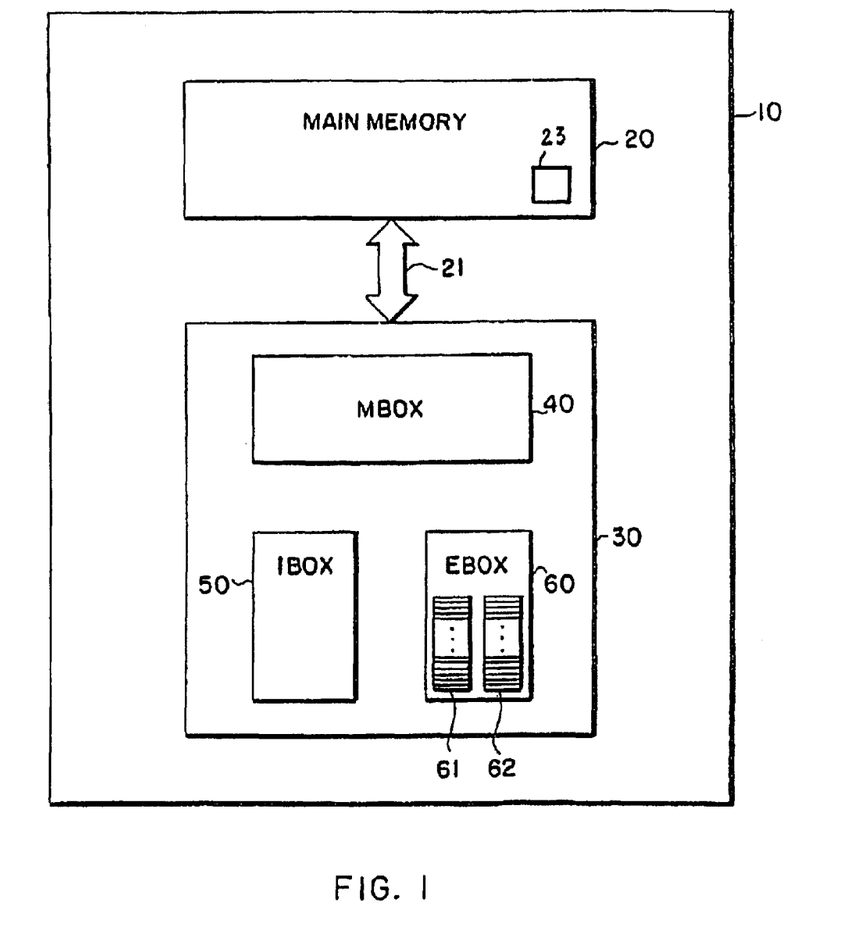
FIG. 1 is a top level block diagram of a digital computer system for speculatively executing instructions.

FIG. 1 is a top level block diagram of a digital computer system 10 for speculatively executing multiple instructions. The digital computer system 10 includes a main memory 20 for storing instructions and data processed by at least one central processing unit (CPU) 30. The CPU 30 communicates with the main memory via bus 21. It should be understood that additional CPUs could be used in the computer system 10 by sharing main memory 20 via bus 21.

As shown in FIG. 1, the CPU 30 includes at least three functional units: a memory access unit 40, an instruction unit 50, and an execution unit 60. These units are sometimes referred to as the MBOX, IBOX, and EBOX, respectively.

The memory access unit or MBOX 40 typically includes a high-speed cache memory storing a copy of a small portion of the information stored in the main memory 20. The cache is employed to increase processing speed by reducing access time to main memory 20 when fetching data and instructions. The MBOX also usually includes a translation buffer, in the form of, for example, a high speed associative memory, to perform virtual to physical address translation during memory accesses.

The instruction unit or IBOX 50 includes a generally conventional program counter (PC). The PC is maintained so that instructions are fetched from main memory 20, via the MBOX 40 and bus 21, in the proper run-time sequence. For example, branch instructions can cause instruction to be fetched in an order different from the stored order. The PC preferably also uses virtual memory addresses rather than physical memory addresses.

The EBOX 60 includes, for example, hard wired logic circuits to perform the operations of the instruction. The invention can also be used with processors of the type which use microcode to process the instruction. Result data generated during the execution of an instruction are subsequently passed back through the MBOX 40 to main memory 20.

The EBOX 60 also includes a generally conventional register bank or register file (RF) having a plurality of general purpose registers (GPRs), generally indicated by reference numeral 61. The RF 61 is for storing data processed by the instructions during their execution. For example, the CPU 30 may have 64 integer registers and 64 floating point registers.

Typically, during the execution of instructions, data are read from main memory 20 into one or more of the GPRs by, for example load instructions. Operations on the data, such as additions, multiplications, and the like, are generally performed on the data stored in the GPRs, since the GPRs can be accessed more quickly than main memory 20. Result data generated during the execution of an instruction are subsequently retrieved from the GPRs, and written back in main memory 20 by, for example, store instructions.

The instructions stored for processing by the computer system 10 are generated by a software program, for example a compiler 23. The compiler 23 translates source code to object code. The compiler 23 is a software program stored in main memory 20 during execution. In the preferred embodiment of the invention, the compiler 23 reorders the sequence of instructions in order to increase total system throughput.

This reordering of the instructions results in the speculative execution of instructions before their use, benefit, or exceptions conditions are known. The compiler can move instructions up in execution order, for example, before branch instructions which may render the moved instructions unneeded. Also load instructions can be ordered ahead of the instructions which store the data.

In order to correctly manage data which may be subject to exception conditions, the compiler, during code generation, assigns registers idempodently. Idempotent register assignment means that the compiler does not change the set of registers which is used for temporary data storage during a particular instruction sequence. That is, during allocation of registers among the various instructions manipulating data in registers, a register is not recycled for storing different data until a point is reached in the execution flow where it is known that the exception condition is resolved.

The techniques described herein are intended to handle the speculative execution of instructions which have been reordered by the compiler 23. The techniques allow for the detection of exception conditions, and the re-execution of the instructions subject to the exception conditions.

Figure 2:
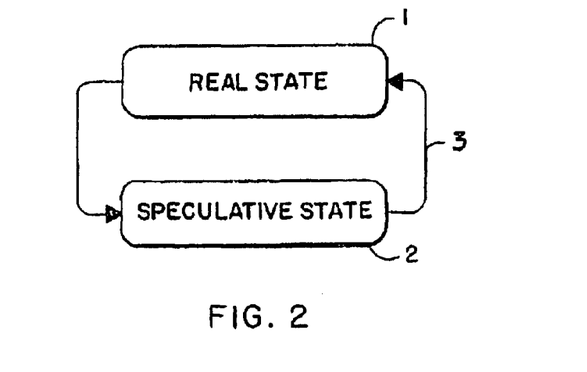
FIG. 2 is state diagram of the computer system of FIG. 1.

Therefore, according to the preferred embodiment, and as is shown in FIG. 2, the digital computer system 10 can assume a real state 1 and a speculative state 2. The real state 1 is the state where all dependencies at a predetermined program counter address have been resolved. The speculative state 2 is the state where the dependencies have not been resolved. Real instructions are executed in the real state, and speculative instructions are executed in the speculative state. The correct program state is enforced at the time that any speculative result data generated from the speculative execution of instructions are deemed ready for incorporation into the real state 1. Note, that the transition 3 from the speculative to the real state coincides with the point at which the compiler 23 can recycle register numbers, now that any dependencies of the data in the registers have been resolved.

The execution flow of a program processed by the computer system 10 comprises both real and speculative instruction execution. The real execution of instructions generating data in the real state 1, and the speculative execution of instructions generating data in the speculative state 2.

Furthermore, speculative execution, according to the embodiments of the invention, comprises two types of executions: data speculative and control speculative.

Execution is defined as data speculative if the validity of the data used during the execution of the instruction is not known at the time of execution of the instruction. In other words, an instruction is data speculative if there are unresolved data dependencies.

Figure 3:
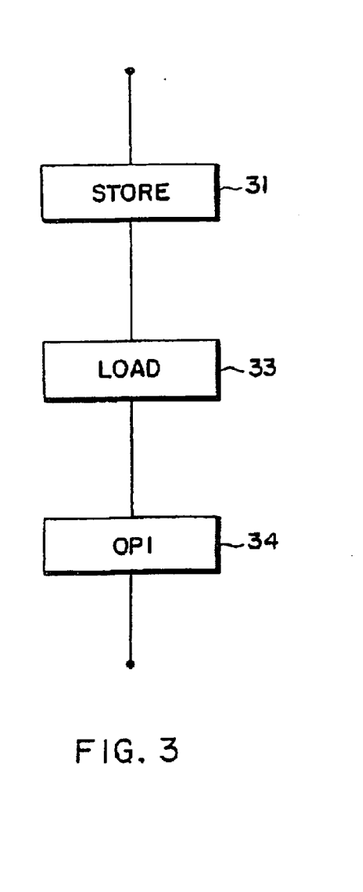
FIGS. 3 and 4 are block diagrams of instructions having data dependencies.
Figure 4:
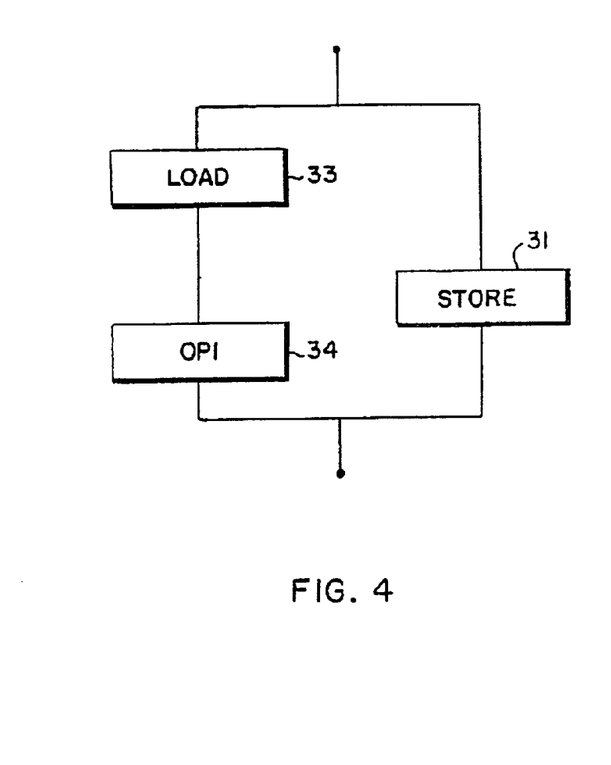

FIGS. 3 and 4 show an example of an instruction sequence having data dependencies, before and after re-ordering. In FIG. 3, a STORE 31 is followed by a LOAD 33, and an OP1 34. It is presumed that the OP1 34 requires the data read by the LOAD 33.

As shown in FIG. 4, it would be an advantage to accelerate the execution of the LOAD 33 to increase throughput, since it known that instructions which read data from memory may have relatively long latencies. In other words, by moving the LOAD 33 up in the execution sequence, the execution cycles of the LOAD 33 used to fetch the data substantially overlap, or are executed in parallel with subsequent instructions. However, if the LOAD 33 is moved ahead of the STORE 31, as shown in FIG. 4, the STORE 31 may write the data needed by the LOAD 33. This is an example of data dependency. However, if the memory addresses of the STORE 31 and the LOAD 33 are computed dynamically, it can only be determined at run time if the LOAD 33 is in fact dependent on data supplied by the STORE 31. In other words, in this case, it is not possible for the compiler 23 to resolve the dependencies. In fact, it is not known whether there is a memory address conflict until after the instructions have been executed. For this reason the sequence of instructions shown in FIG. 4 has data dependencies.

Execution is defined as control speculative if it is not known at the time of generating instruction whether the instruction should have been executed. This is, the control flow of the instructions is unresolvable.

Figure 5:
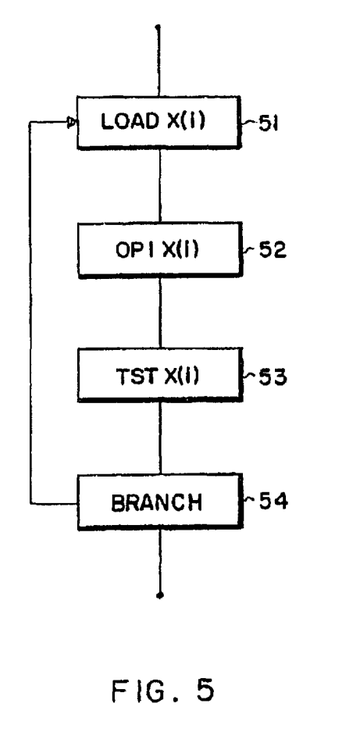
FIGS. 5 and 6 are block diagrams of instructions having control dependencies.
Figure 6:
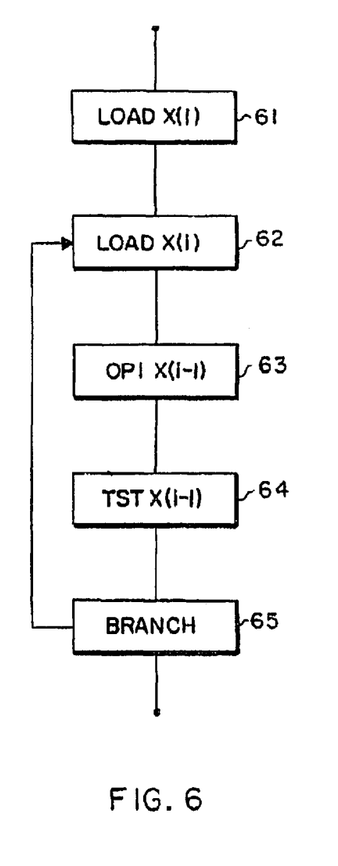

FIGS. 5 and 6 show an example of an instruction sequence executed repetitively in a loop having control dependencies, before and after re-ordering. In the example, it is presumed that there are N iterations of the loop, expressed as i=1 to N, and x(i) means the data stored at a location corresponding to x(i).

In FIG. 5, an LOAD x(i) 51 is followed by an OP1 x(i) 52, a TST x(i) 53, and a BRANCH 54. During the first iteration, the load is for x(1), the second iteration x(2), and so forth. It is presumed that the OP1 x(i) 52 requires the data read by the LOAD x(i). Therefore, during each iteration of the loop, the OP1 x(i) 52 can not be executed until the LOAD 51 has completed.

It would be an advantage to accelerate the execution of the LOAD. By accelerating the LOAD, the latency associated with the LOAD can be hidden to increases throughput. Therefore, as shown in FIG. 6, the first iteration through the loop, LOAD x(1) 61, is handled outside the loop. The first instruction of the loop is now primed to fetch the data for the next iteration of the loop, LOAD x(i) 62. This instruction is followed by the OP1 x(i–1) 63 which during the first iteration operates on data associated with x(1), and during subsequent iterations operates on data loaded during the previous iteration, e.g., x(i–1).

In other words, while the loop is processing data loaded during the previous iteration, the data for the next iteration is fetched on the speculation that there will be a next iteration of the loop. This will be true for all but the last iterations of the loop. By overlapping the fetch for the next iteration with the processing of the previous fetch, the latency associated with the load instruction is effectively hidden.

However, under certain conditions, as determined by the control flow of the loop is changed, rendering the execution of the LOAD x(i) 62 superfluous. For this reason the sequence of instructions shown has control dependencies.

According to the embodiments of the invention, instructions generating data in the speculative state 2 are instructions that have been executed under the assumption that the result data generated during their execution will, at some point in the future, be incorporated into the real state 1. However, result data generated by the speculative execution of instructions are not incorporated into the real state 1, until pending data and control dependencies are resolved.

Any exception conditions encountered when generating data in the real state 1 are serviced immediately. Exception conditions encountered for data generated in the speculative state 2 are held pending until the results are incorporated into the real state 1.

A thread is defined as a set of instructions related by control or data dependencies. The thread begins with the execution of the first instruction in the set of related instructions. The thread ends when the last instruction of the set is executed and the result data generated during the execution of the thread are incorporated into the real state 1.

Figure 7:
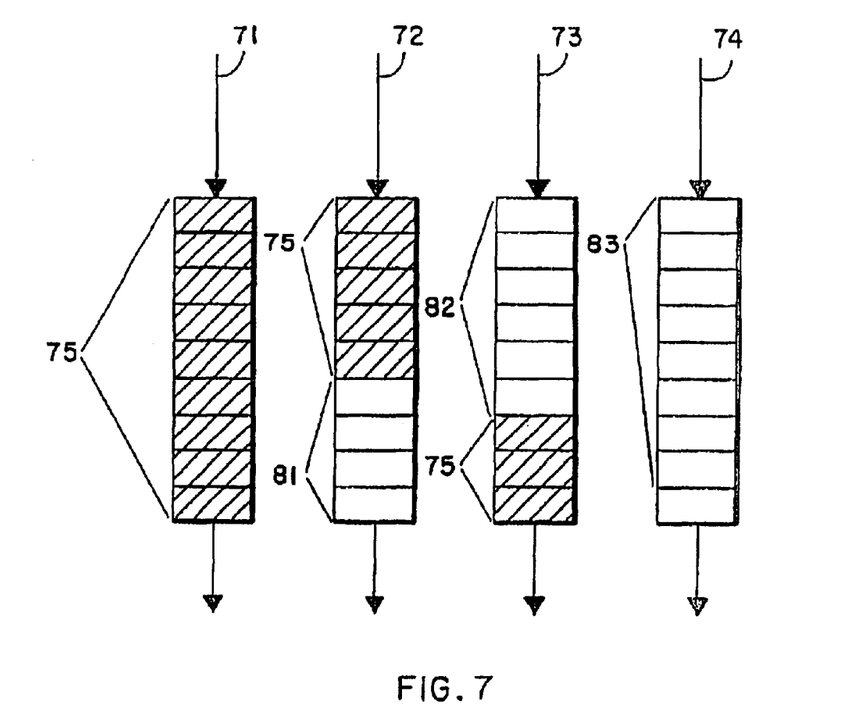
FIG. 7 is a block diagram of sets of related instructions for executing in parallel.

FIG. 7 shows sets of related instructions, threads 71–74 which are executed substantially in parallel in CPU 30. In each of the thread 71–74, as an example, the instructions executed in the real state 1 are diagonally hatched, and generally indicated by reference numeral 75. Instructions which are executed in the speculative state 2 include threads 81, 82, and 83. The threads 71–74 are generated by the compiler 23 in a manner to maximize the number of instructions that are processed in parallel by the CPU 30.

Figure 8:
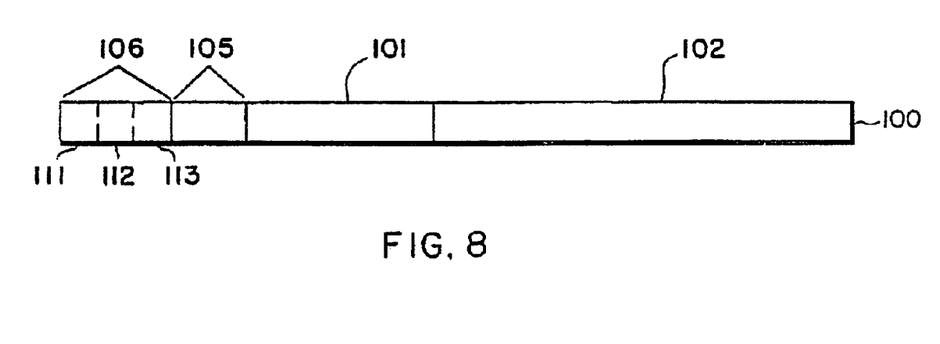
FIG. 8 is a block diagram of an instruction.

FIG. 8 shows the organization of an instruction 100 stored in main memory 20 as executable object code produced by the compiler 23, according to an exemplary embodiment of the invention. It should be understood that the CPU 30 can fetch, at any one time, a plurality of instructions 100, for example, four. Each one of the fetched instructions 100 is to be executed substantially in parallel. Each field of each instruction 100 includes one or more bits of data, which will now be described in greater detail.

The instruction 100 includes an opcode field 101 for storing an opcode. The opcode is used to specify the specific operation that should be executed by the EBOX 60. In an exemplary embodiment, the opcode field 101 is six bits. It should be apparent that the opcode field 101 can have a different number of bits, depending on the number and types of opcodes stored therein.

The instruction 100 also includes an operand field 102 for storing one or more operands. The operands are used to specify addresses of data to be loaded and stored during the execution of the instruction. The addresses may reference, by way of example, main memory 20 or the GPRs of the RF 61.

The operand field can include, for example, two source operands, and one destination operand. The exact structure of the operand field 102 is of course dependent on the opcode field 101. It is to be understood that the invention can also be used with computers systems using different types of instruction organizations.

In order to manage the speculative execution of instructions in a thread, the instruction 100 further includes two fields for facilitating the speculative execution of instructions. The two fields are an identification field (IF) 105, and a speculative state field (SSF) 106. The IF 105 and the SSF 106, like the opcode field 101 and the operand field 102, are generated by the compiler 23 when the source code is translated to object code.

The IF 105 includes, for example, two bits to allow the concurrent identification of up to four separate sets of related instructions. Furthermore, when the IF 105 is combined with the program counter of the first instruction of a thread, a unique identification number is generated. This identification number is used to uniquely identify the related instructions of a thread.

The SSF 106 is used to indicate transitions between the real and speculative states 1 and 2, and whether an instruction should be executed in the real or speculative state. In other words, the SSF 106 tells the CPU 30 how to process the instruction with respect to the real and speculative states 1 and 2.

Starting a thread enables the propagation of exception reporting inside the confines of the speculative state 2 in which the thread is executing, until the end of the thread is detected. When the end of the thread is detected, propagated exception conditions are resolved and the result data generated by the thread are incorporated into the real state 1.

The SSF field 106 includes: a start bit (SB) 111, an end bit (EB) 112, and an exception bit (XB) 113. The SB 111 is set to a logical "1" for the first instruction of a thread, otherwise the SB 111 is set to a logical "0". The SB 111 is used to signal the start of execution in the speculative state 2 and enables the propagation of exception signaling.

Furthermore, the SB 111 also causes the current value of the PC to be stored in a register.

The EB 112 is set to a logical "1" for the last instruction in a thread, otherwise the EB 112 is set to a logical "0". The EB 112 is used to signal the end of a thread, and enables the resolution of any exception conditions accumulated during the execution of the thread.

During the transition 3 from the speculative state 2 to the real state 1, as shown in FIG. 2, at the end of a thread, exception conditions are resolved, and speculative result data generated by the instructions of the thread are incorporated into the real state 1.

The XB 113 is set to a logical "1" for instructions which are to be executed in the real state 1, otherwise the XB 113 is set to a logical "0". Any exception conditions encountered for instructions which have the XB 113 set to "1" are signaled and resolved immediately.

For instructions which have the XB 113 set to a logical "0," that is, for instructions executing in the speculative state 2, exception conditions are held pending until the last instruction in the thread has been executed, and the speculative result data are joined with the real state 1.

In addition to the register file 61, the EBOX 60, of FIG. 1, also includes a speculative state register file (SSRF) 62. The SSRF 62 is used to propagate speculative information from source GPRs to destination GPRs during the execution of speculative instructions. The SSRF 62 is also used during the reprocessing of a thread to permit recovery from an exception condition. The technique of reprocessing a thread for exception condition resolution is called "replay."

The SSRF 62 includes one speculative state register SSR for each GPR of the RF 61. That is, there is a one to one correspondence between the GPRs of the RF 61 and the SSRs of the SSRF 62. As will be explained in greater detail with reference to FIGS. 10 and 11, addressing the RF 61 by a GPR number or address yields the data stored in the register, and addressing the SSRF 62 by the GPR number yields the speculative state associated with the GPR.

Figure 9:
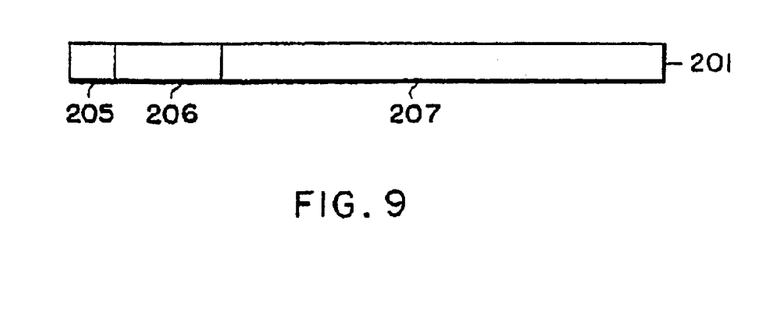
FIG. 9 is a block diagram of a speculative state register.

As shown in FIG. 9, the speculative state of a GPR as stored in each corresponding SSR 201 comprises a register exception flag (RXF) 205, a register identification field (RIF) 206, and a register PC field (RPCF) 207.

The RXF 205 is a one bit exception flag to hold, signal, and propagate the exception state of the corresponding GPR during the execution of the instructions of a thread. If the RXF 205 set to logical "1" the data stored in the corresponding GPR of the RF 61 are subject to an exception condition, otherwise, if the RXF 205 is set to a logical "0" the corresponding GPR data are not subject to an exception condition.

The RIF 206 is two bits. The RIF 206 is used to identify the thread which caused data to be stored in a GPR which are subject to an exception condition. When a thread is started, the IF 105 of the first instruction of the thread is stored in the RIF 206 of the SSR. During the execution of subsequent instructions of the thread the RIF 206 is propagated from source registers to destination registers.

Also, when an exception condition is encountered, the starting PC of the thread is stored in the RPCF 207 of the corresponding SSR 201. The starting PC is the memory address of the first instruction of the thread. The RPCF is used as the initial PC, if the thread is being replayed to resolve any held exceptions.

Subsequently, if a GPR, which has the RXF 205 of the corresponding SSR set to a logical "1", is used as a source GPR for generating data for a destination GPR, the speculative state of the source GPR, as stored in the corresponding SSR is propagated to the SSR corresponding to the destination GPR.

Figure 10:
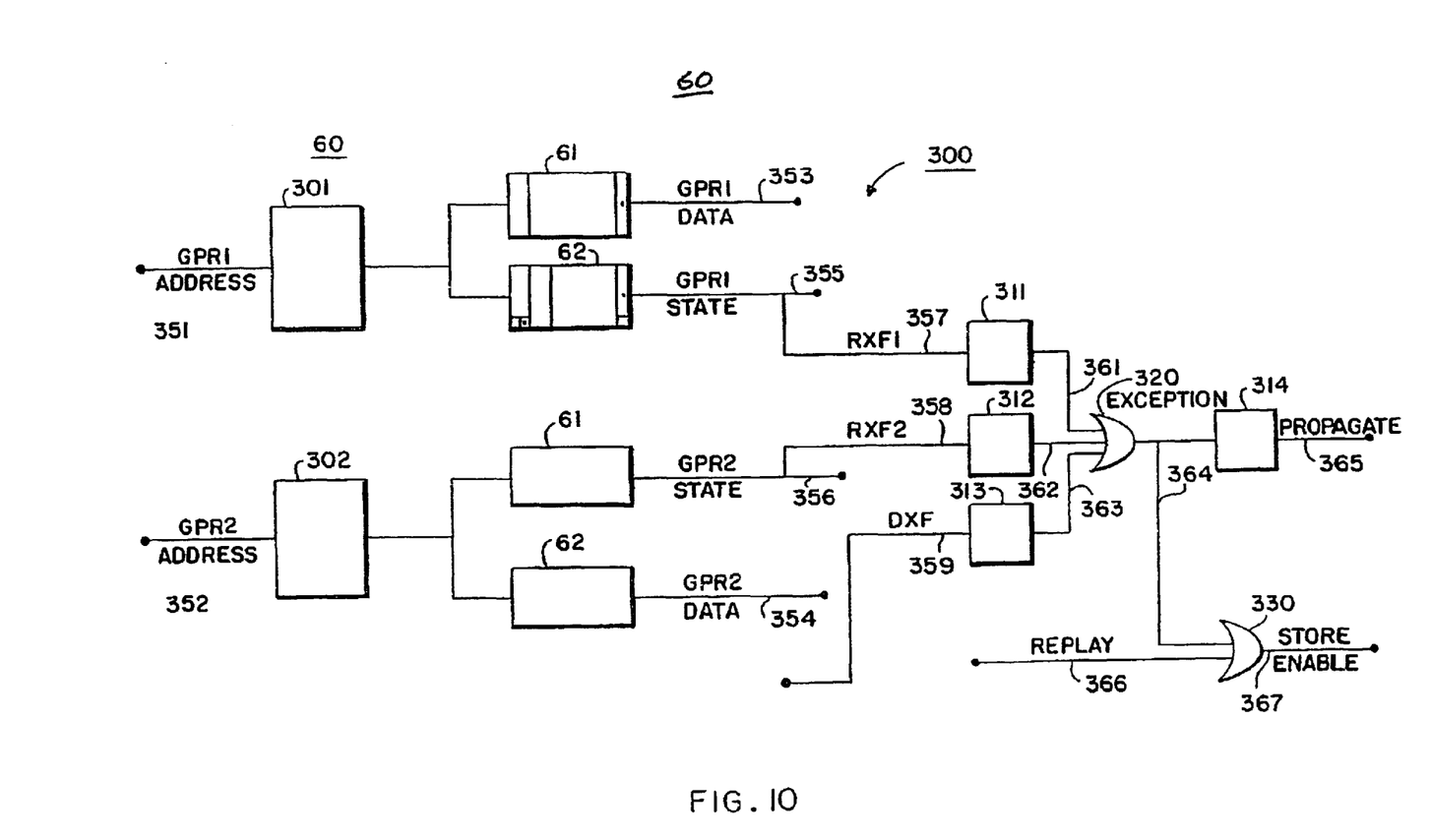
FIG. 10 is a block diagram of a live/dead circuit for propagating exception conditions.

Turning now to FIG. 10, there is shown a "live/dead" circuit for use in an exemplary embodiment of the invention, for use during the speculative execution of instructions having dependencies. The propagation of speculative state information from GPR to GPR during speculative execution is enabled by the live/dead circuit (LDC) 300, as is shown in FIG. 10. The LDC 300 is also used during replay when exception conditions are resolved to enable the incorporation of speculative data into the real state 1 of the computer system.

The LDC 300 includes first and second latches 301 and 302. The input 351 to the first latch 301 is the register address or number of the first source operand, for example, GPR1. The second latch 302 receives as input 352 the address or number of the second source operand, GPR2.

The outputs of both latches 301, 302 are used to address the RF 61 and the SSRF 62, respectively. Addressing the RF 61 by the GPR1 and GPR2 addresses yields the GPR1 and GPR2 data 353, 354 to be used by the first and second source operands, respectively. Likewise, addressing the SSRF 62 yields the GPR1 and GPR2 speculative states 355–356 as stored in the SSRs corresponding to GPR1 and GPR2, including the exception states RXF1 and RXF2 357–358 stored in the RXF 105 of each of the SSRs. The RXF1 and RXF2 are held separately in latches 311 and 312, respectively.

A latch 313 receives as its input a signal DXF 359 which indicates if an exception condition occurred during the execution of the instruction. In other words, the DXF signal indicates that there is an exception condition with respect to the destination operand as a result of executing the instruction.

The outputs 361–363 of the three latches 311, 312, and 313 are connected to a three input OR gate 320. The output of the OR gate 320, carrying an EXCEPTION signal 364, is connected to a latch 314.

The output from latch 314, a signal PROPAGATE 365, is used to propagate the speculative state, SSR 201, from the source operands of the instruction to the destination operand of the instruction.

The LDC 300 further includes a two input OR gate 330. The first input of OR gate 330 is connected to the output of OR gate 320 carrying the EXCEPTION signal 364. The second input of OR gate 330 receives a signal REPLAY on line 366 indicating whether exception recovery or replay is taking place. That is, the second input to OR gate 330 will be a logical "1" if the instructions of the excepting thread are being replayed, otherwise, if replay is not taking place, the second input will be a logical "0".

The output of the OR gate 330, a signal STORE ENABLE 367, enables the use of data stored in registers during replay. In other words, the output signal STORE ENABLE 367 indicates whether the data in the register were generated by the thread currently being replayed, and are therefore "live". If the data were not generated by the instructions of the thread being replayed, the data are "dead". If the data are dead, they are not used during replay. Otherwise, if the data are live, the instruction needs to be re-executed, and exception conditions encountered are resolved immediately.

Figure 11:
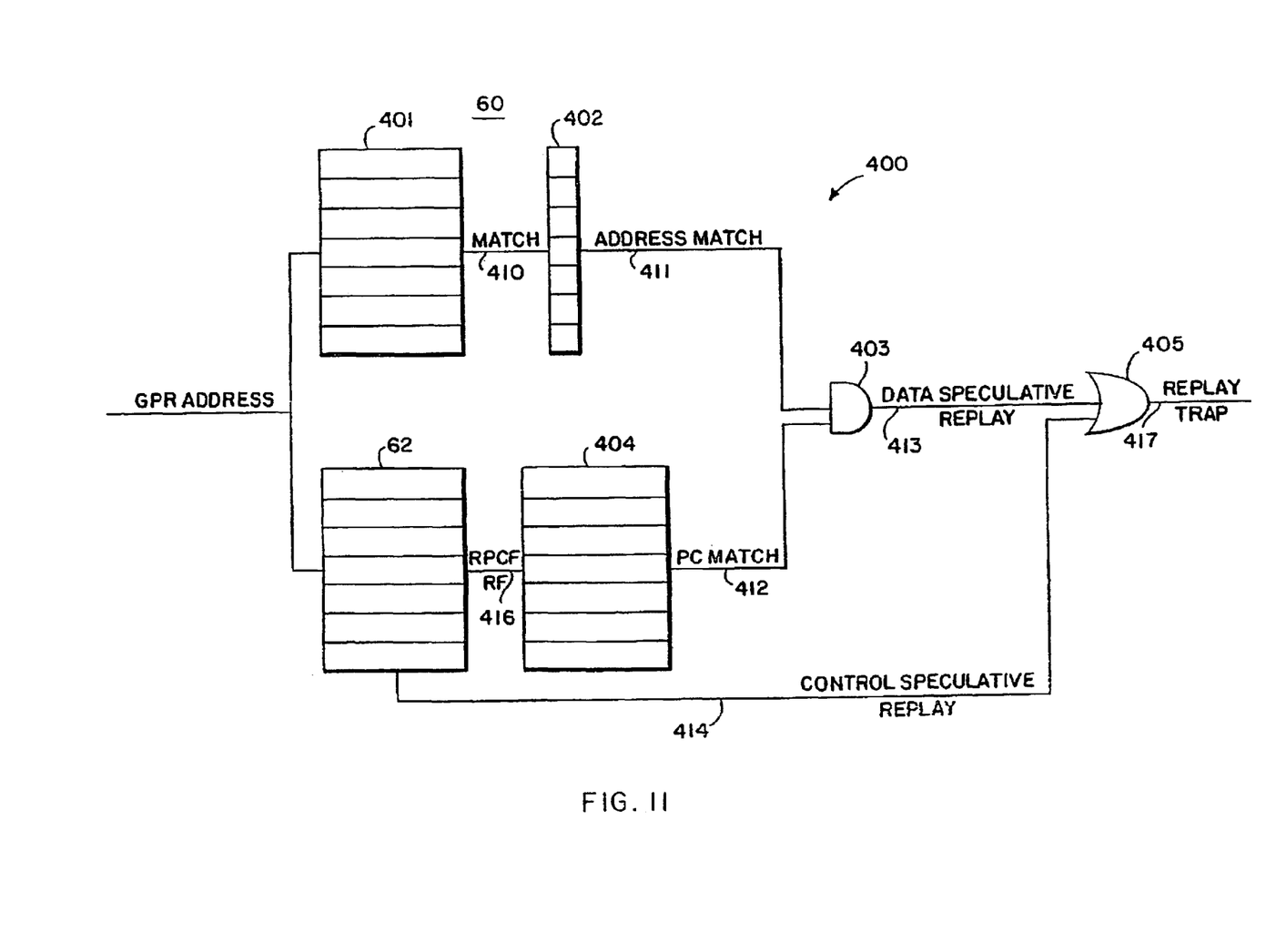
FIG. 11 is a block diagram of a load instruction passes store circuit.

Now turning to FIG. 11, there is shown a circuit for enforcing the execution order of selected instructions, according to an exemplary embodiment of the invention. FIG. 11 shows a load instruction passes store circuit (LIPSC) 400. The LIPSC 400 is used to verify the correct order of memory to register loads, and register to memory stores. That is, the LIPSC 400 provides for the recovery of reordered load/store pairs sharing the same memory address. Such reordering is generally not available in known systems, causing fatal program execution errors.

The operation of the LIPSC 400 will be described in conjunction with a sequence of instructions, as shown in Table 1. Note that the instruction sequence shown in Table 1 also shows the idempotent assignment of registers by the compiler 23. That is, the registers allocated to the sequence are not reassigned for other data use during the sequence. That is, each register only has one use during the sequence.

TABLE 1

|  |  |
| --- | --- |
|  | ; start of thread and speculative state |
| LD r0, A | ; load GPR0 from memory address A |
| ST r7, B | ; store GPR7 at memory address B |
|  | ; if A not equal B there is no error |
|  | ; if A equal B the load is out of order |
| MUL r0, r1, r2 | ; multiply r0 by r1 to yield r2 |
| ADD r2, r3, r4 | ; take r2 add to r3, store in r4 |
|  | ; end of thread and speculative state |
|  | ; |
|  | ; Note, prior to reordering, |
|  | ; ST r7, B preceded LD r0, A |

The first instruction (LD) in the thread, i.e., an instruction with the SB 111 set to a logical "1", is a load register from memory instruction. Because SB 111 is set to logical "1" there is a transition from the real state 1 to the speculative state 2. The LD instruction loads general purpose register (r0, or GPR0) from memory location A.

The next instruction (ST) stores data from a register (r7, or GPR7) at memory location B. Note, that the load instruction is out of order. If memory location A is the same as memory location B.

Then, a multiply instruction (MUL) is executed which uses the data loaded into the register by the load instruction of the thread. And the last instruction of the thread, indicated by the EB 113 set to a logical "1", uses the result of the multiply operation in an add operation (ADD).

For data speculative operations, when the store instruction is executed, a determination is made if a preceding load was reordered out of sequence. If so, replay is initiated at the end of the thread to avoid a fatal program error due to the use of invalid data.

The LIPSC circuit 400 allows loads to be moved ahead of stores, as shown in Table 1, to increase the degree of parallelism. Further, the LIPSC 400 circuit allows non-fatal recovery, even if the reordered load/store pair use the same memory address.

The LIPSC 400 includes a first content addressable memory (CAM1) 401. CAMs are well known in the art of computer systems. A CAM, as its name implies, is a memory that can be accessed not only by its address, but also by its contents. That is, the CAM not only includes locations storing data, but also includes a digital comparator which compares, in parallel, the contents of all of the locations of the CAM for a particular data or "content" pattern. If there is a match at any CAM locations, the CAM generates an output signal indicating the occurrence of the match between the "input" contents, and the "stored" contents, for each of the locations where there is a match.

The CAM1 contains, for example, one location corresponding to each of the general purpose registers of the system 10.

Generally, the CAM has two modes (write and read) in which they can operate. In a first mode (write), an input address is specified to store data at a CAM location corresponding to the input address. In a second mode (read), the CAM is addressable by its contents. That is, the input to the CAM is the "contents" for which the CAM is to search all of its locations for a match. In the read mode, the output of the CAM are signals indicating that the contents stored at one or more locations in the CAM match the input "contents".

During a write operation, the CAM1 stores the memory address used by speculatively executed "load" instructions. Load instructions, in general, are instructions which load a register with data from main memory 20. That is, the input address to the CAM1 corresponds to a register address, and the data stored in the CAM1 are the memory address used by the "load" instruction.

During "store" operations, the CAM1 checks whether a speculatively "load" was executed. That is, the load instruction uses the same memory address as a subsequently executed "store" instruction. In other words, if the memory address used by a store instruction was previously written to the CAM1 401, data dependency may exists.

For example, with reference to the instruction sequence above, the CAM 401 stores memory address A after the "LD" instruction has been executed. During the execution of the "ST" instruction, the CAM1 401 is checked to see if memory address B is equal to a previously written memory address A.

The outputs of the CAM1 401, carrying MATCH 410 signals, are connected to a latch 402. It should be understood that the latch 402 has one bit for every location of the CAM1 401. In other words, there is one bit, and one MATCH signal 411 for each general purpose register. If there are any matches in the CAM 1, the corresponding bits in the latch 402 are set to a logical "1" to indicate that LD/ST instruction pairs share the same memory address.

In order to provide a signal which indicate address load/store address matches, the set of outputs of the latch 402, ADDRESS MATCH 411, are connected to a first input of two input AND gates 403. For clarity, only a single gate is shown in the drawings. It should be understood that there is one AND gate 403 for each of the bits of the latch 402. The outputs of the AND gates 403 indicate address matches on load and store instructions.

Should there be address matches, it is also necessary to determine if the load is speculative and related to the store instruction. This determination is facilitated by a second conventional content addressable memory CAM2 404. There is a one to one correspondence between locations of the CAM2 and general purpose registers of the RF 61 and the SSRs 201 of the SSRF 62.

Each location of the CAM2 stores the RIF 206 and the RPCF 207 of the corresponding general purpose register as provided by outputs 416 of the SSRF 62 when the CAM2 is accessed in the write mode during the execution of "load" instructions. In the read mode, at the end of a thread, the CAM2 404 is checked to see if any of the registers used for load and store instructions share the same RIF 206 and RPCF 207. The combination of the RIF and RPCF being the unique identification of a thread. Matches in the CAM2 are indicated as output signals PC MATCH 412. The PC MATCH signals 412 are a second set of inputs to AND gates 403.

If there is a match in both CAM1 (ADDRESS MATCH 411) and CAM2 (PC MATCH 412) the load instruction uses the same memory address as the store instruction. In this case, DATA SPECULATIVE REPLAY SIGNAL 413 is generated by AND gates 403 to signal the requirement for a thread replay.

The outputs of the AND gates 403, DATA SPECULATIVE REPLAY 413, are connected to two input OR gates 405. The other input of the OR gates 405 is a CONTROL SPECULATIVE REPLAY signal 414.

The CONTROL SPECULATIVE REPLAY signal is generated from the EXCEPTION signal 364, as determined by the LDC 300.

In either case, the output of the OR gate 405 is a signal REPLAY TRAP 417, which is used to start the reprocessing of the instructions of the thread. The PC at which to start the replay is supplied by the RPCF 207 of any of the registers which have an exception associated with it.

Figure 12:
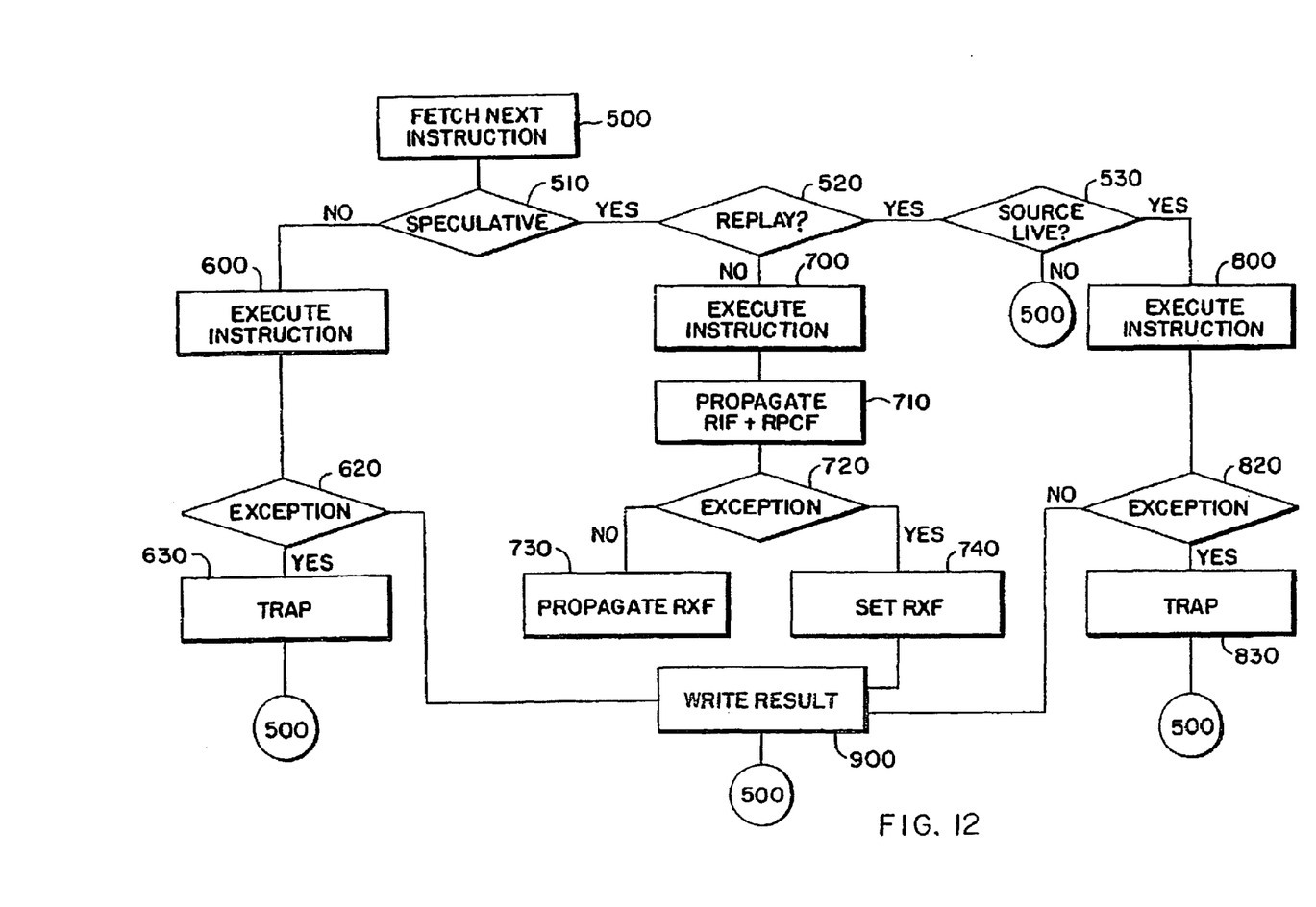
FIG. 12 is block diagram of a procedure for speculative instruction execution.

With the foregoing in mind, the speculative execution of instructions will now be further described with reference to the procedure shown in FIG. 12.

In step 500 the next instruction to be executed is fetched from main memory 20, via the MBOX 40, at a location indicated by the PC. In step 510, the SSF 106 of the instruction is examined to determine if the instruction should be executed in the real state 1, or the speculative state 2. If the instruction is to be executed in the real state 1, then continue with step 600, otherwise, if the instruction is to be executed in the speculative state 2, continue with step 520.

Real State Instruction Execution

The instruction is executed in step 600. In step 620, determine if there is an exception condition as a result of the execution of the instruction in step 600. If there is an exception condition, proceed with step 630 and cause an exception trap to process the exception condition. Otherwise, if there is no exception condition, write the result data in step 900 and continue processing by fetching the next instruction in step 500.

Speculative Instruction Execution (Not Replay)

If the instruction is to executed in the speculative state, in step 520 make a determination if the thread is being replayed. If this is a replay situation continue with step 530. Otherwise, if this is not a replay situation, continue with step 700.

In step 700, execute the instruction. In step 710 propagate the speculative state (RIF 206 and RPCF 207) in accordance with the live/dead circuit 300. In step 720, determine if an exception condition occurred. An exception being either a pre-existing exception (RXF) in one of the source operands, or an exception associated with the destination operand as determined by the DXF signal of the LDC 300.

If there is an exception, set the RXF 205 of the destination to a logical "1". Otherwise, propagate the RXF 205. In either case, after step 730 or step 740, write the result in step 900, and continue by fetching the next instruction in step 500.

Speculative Instruction Execution (Replay)

If this is a replay situation, in step 530, check if the source register is live or dead as determined by the live/dead circuit 300. If the data are dead fetch the next instruction in step 500. Otherwise, execute the instruction in step 800. In step 820, determine if an exception condition occurred. If an exception occurred, generate a trap in step 830. If there was no exception, write the result in step 900 and continue by fetching the next instruction in step 500.

It is not intended that the present invention be limited to the specific embodiment disclosed in the above description and the associated drawings. Numerous modifications and adaptations of the invention will be apparent to those skilled in the art. Thus, it is intended by the following claims to cover all such modifications and adaptations falling within the scope of the invention.

What is claimed is:

1. A system for executing computer instructions in parallel, comprising:

an identification for each instruction to be executed, said identification being independent of an execution order of said identified instruction;

means for grouping instructions into a plurality of sets according to said identification, instructions having identical identifications being grouped into the same set, each set including a plurality of instructions, said plurality of instructions of each set arranged in a normal execution order, said sets for executing said plurality of instructions of said sets substantially in parallel as a plurality of execution flows, there being one execution flow associated which each set, each instruction of said plurality of instructions of each set having said identification to distinguish the instructions of said sets when said sets are executed in parallel as said associated plurality of execution flows;

means for reordering said plurality of instructions within said sets to accelerate execution, said instructions being reordered independent of said identification of the instructions;

means for marking predetermined instructions of said sets if said predetermined instructions have data dependencies or control dependencies unresolvable by said means for reordering;

a computer system executing said sets in parallel as said plurality of execution flows;

means for determining if particular one of said predetermined instructions of said sets is subject to an exception condition while executing; and means, responsive to detecting said exception condition, for repeating execution of a particular set identified by said identification of said particular predetermined instruction to resolve said exception condition.

2. The system as in claim 1 wherein said predetermined instructions have data dependencies if a validity of data used by said predetermined instructions is unresolvable by said means for reordering, and wherein said predetermined instructions have control dependencies if an associated execution flow of said predetermined instructions is unresolvable by said means for reordering, and further comprising:

means for resolving said validity of data, and means for resolving said execution flow.

3. The system as in claim 1 wherein said predetermined instructions generate speculative data, said speculative data includes a memory address of a first instruction of said corresponding set identified in said predetermined instructions, said means for repeating beginning execution at said memory address of said corresponding set.

4. The system as in claim 3 wherein said speculative data includes an exception flag if said particular set is subject to said exception condition.

5. The system as in claim 4 further including means for propagating said exception flag along said associated execution flow to data derived from said speculative data.

6. The system as in claim 5 further including a register for storing said speculative data, and a state register for storing said memory address, said indicator, and said exception flag.

7. The system as in claim 1 wherein said computer system further includes means for determining if in said associated execution flow a load instruction of said particular set reads data from a memory location of a main memory before a store instruction of said particular set writes data to said memory location of said main memory.

8. The system as in claim 7 wherein said means for determining includes a content addressable memory for storing said memory address when data are read, and said content addressable memory comparing said memory address when data are written.

9. A method for executing computer instructions in parallel, comprising:

identifying each instruction to be executed with an identification which is independent of an execution order of the instruction;

grouping instructions into a plurality of sets according to said identification, each set including a plurality of instructions having identical identifications, said plurality of instructions of each set arranged in a normal execution order, said sets for executing in parallel as a plurality of execution flows, there being one execution flow for associated with each set, each instruction of said plurality of instructions of said sets having said identification to distinguish the instructions of said sets when said sets are executed in parallel;

reordering, independent of said identification of the instructions, said plurality of instructions within said sets to accelerate execution;

marking predetermined instructions of said sets if said predetermined instructions have control dependencies or data dependencies unresolvable due to said reordering;

executing said sets in a computer system substantially in parallel as said plurality of execution flows;

determining if a particular one of said predetermined instructions of a particular set is subject to an exception condition; and repeating execution of said particular set identified by said identification to resolve said exception condition.

10. The method as in claim 9 wherein said step of marking further includes the step of marking instructions if an execution flow of said set is unresolvable, and marking instructions if a validity of data used by said set is unresolvable, and further comprising the steps is of resolving said validity of data and said execution flow after determining that said particular set is subject to said exception condition.

11. The method as in claim 10 wherein said execution step further includes the steps of determining if in said associated execution flow a load instruction of said particular set reads data from a memory location before a store instruction of said particular set writes data to said memory location.

12. The method as in claim 11 wherein said means for determining includes a content addressable memory for storing said memory address.

13. The method as in claim 9 wherein said predetermined instructions generate speculative data, and further including the step of storing a memory address of a first instruction of said particular set with said speculative data, said repeating beginning execution at said memory address.

14. The method as in claim 13 further including the step of storing an exception flag with said speculative data if said particular set is subject to said exception condition.

15. The method as in claim 14 further including the step of propagating said exception flag along said associated execution flow to data derived from said speculative data having said exception flag.

16. A method for executing instruction in parallel in a computer system, comprising:

identifying each instruction to be executed with an identification which is independent of an execution order;

reordering the instructions independent of the identification of the instructions;

executing the instructions in parallel as a plurality of execution flows, each instruction of each corresponding execution flow identified with the corresponding execution flow, the instructions of each execution flow executing in parallel with each other;

determining if a particular instruction is subject to an exception condition;

identifying a particular execution flow corresponding to the identification of the particular instruction; and repeating executing of the instructions of the particular execution flow to resolve the exception condition.

17. A method for executing instructions in parallel in a computer system comprising:

identifying each instruction to be executed with an identification which is independent of an execution order;

grouping instructions into a plurality of sets according to said identification;

reordering within at least one of said sets the instructions independent of the identification of the instructions;

executing the instructions in parallel as a plurality of execution flows, each instruction of each execution flow being identified to correspond to said execution flow;

determining that a particular instruction is subject to an exception condition;

identifying a particular execution flow corresponding to the identification of the particular instruction; and repeating executing of the instructions of the particular execution flow to resolve the exception condition.

18. A method as in claim 17 wherein:

said step of identifying each instruction to be executed occurs during compilation of the instructions to be executed.

* * * * *